(12) United States Patent
Marsch

(10) Patent No.: US 11,650,305 B2
(45) Date of Patent: May 16, 2023

(54) SYSTEM FOR ENHANCED OBJECT TRACKING

(71) Applicant: VEONEER SWEDEN AB, Vargarda (SE)

(72) Inventor: Sebastian Marsch, Schweinfurt (DE)

(73) Assignee: VEONEER SWEDEN AB, Vårgårda (SE)

( * ) Notice: Subject to any disclaimer, the term of this patent is extended or adjusted under 35 U.S.C. 154(b) by 312 days.

(21) Appl. No.: 16/626,925

(22) PCT Filed: Jun. 15, 2018

(86) PCT No.: PCT/EP2018/065990
§ 371 (c)(1),
(2) Date: Dec. 27, 2019

(87) PCT Pub. No.: WO2019/001991
PCT Pub. Date: Jan. 3, 2019

(65) Prior Publication Data
US 2020/0132827 A1    Apr. 30, 2020

(30) Foreign Application Priority Data

Jun. 30, 2017  (EP) ..................................... 17178908

(51) Int. Cl.
*G01S 13/72* (2006.01)
*G01S 13/931* (2020.01)
*G06F 17/18* (2006.01)

(52) U.S. Cl.
CPC ............ *G01S 13/72* (2013.01); *G01S 13/931* (2013.01); *G06F 17/18* (2013.01); *G01S 2013/93272* (2020.01)

(58) Field of Classification Search
CPC ................... G01S 13/72; G01S 13/931; G01S 2013/93272; G06F 17/18
See application file for complete search history.

(56) References Cited

U.S. PATENT DOCUMENTS

| 8,229,663 | B2 | 7/2012 | Zeng et al. |
| 8,812,226 | B2 | 8/2014 | Zeng |
| 9,599,706 | B2 | 3/2017 | Zeng et al. |

(Continued)

OTHER PUBLICATIONS

International Search Report and Written Opinion of PCT/EP2018/065990 dated Aug. 21, 2018.

*Primary Examiner* — Peter M Bythrow
*Assistant Examiner* — Nazra Nur Waheed
(74) *Attorney, Agent, or Firm* — Dickinson Wright PLLC

(57) ABSTRACT

A vehicle radar system (3) including a control unit arrangement (8) and at least one radar sensor arrangement (4) arranged to transmit signals (6) and receive reflected signals (7). The vehicle radar system (3) acquires a plurality of measured radar detections (10, 11, 12, 13) at different times. The control unit arrangement (8) engages a tracking algorithm using the present measured radar detections (10, 11, 12, 13) as input such that at least one track is initialized. For each track, the control unit arrangement (8) calculates a calculated previous radar detection (14) that precedes the present measured radar detections (10, 11, 12, 13), and to re-initialize the tracking algorithm using the present measured radar detections (10, 11, 12, 13) in combination with the calculated previous radar detection (14).

10 Claims, 8 Drawing Sheets

(56) References Cited

U.S. PATENT DOCUMENTS

| | | | |
|---|---|---|---|
| 2008/0111730 A1* | 5/2008 | Ding | G01S 13/726 342/90 |
| 2008/0306666 A1 | 12/2008 | Zeng et al. | |
| 2010/0191391 A1 | 7/2010 | Zeng | |
| 2010/0198513 A1 | 8/2010 | Zeng et al. | |
| 2015/0097717 A1* | 4/2015 | Tsai | G01S 3/74 342/147 |
| 2016/0291149 A1* | 10/2016 | Zeng | G01S 13/874 |
| 2017/0363737 A1* | 12/2017 | Kaino | G01S 13/345 |
| 2019/0179002 A1* | 6/2019 | Takayama | G01S 13/723 |

* cited by examiner

SYSTEM FOR ENHANCED OBJECT TRACKING

CROSS-REFERENCE TO RELATED APPLICATIONS

This application is a 35 U.S.C. § 371 national phase of PCT International Application No. PCT/EP2018/065990, filed Jun. 15, 2018, which claims the benefit of priority under 35 U.S.C. § 119 to European Patent Application No. 17178908.4, filed Jun. 30, 2017, the contents of which are incorporated herein by reference in their entirety.

FIELD OF THE INVENTION

The present disclosure relates to a vehicle radar system including a control unit arrangement and at least one radar sensor arrangement that is arranged to transmit signals and receive reflected signals. The vehicle radar system is arranged to acquire a plurality of measured radar detections at different times and to engage a tracking algorithm.

BACKGROUND

Many vehicles include radar systems which are arranged for object detection, being able to provide a warning to a driver about an object in the path of a vehicle, as well as providing input to vehicle systems such as Adaptive Cruise Control (ACC) and Rear Cross Traffic Avoidance (RCTA) systems, which can provide both warnings and activate Autonomous Emergency Braking (AEB) to avoid a collision with an object behind a host vehicle.

Such radar systems include one or more forward-looking radar transceivers and one or more rearward-looking radar transceivers in an ego vehicle. It can be difficult to accurately estimate the heading of a remote vehicle or object, especially if the remote vehicle or object is moving in a predominantly lateral or tangential direction relative to the ego vehicle. This is for example the case when an ego vehicle is backing out from a parking space, entering a road with an oncoming remote vehicle that is driving towards a position behind the host vehicle, and in this case an RCTA system is used.

An RCTA system needs the velocity, distance and azimuth angle of the remote vehicle in order to determine if any warning or emergency braking is needed. In order to be able to present an early prediction, the RCTA system includes a control unit that is arranged to run a tracking algorithm that in turn is arranged to predict the movement of the remote vehicle, for example by use of a Kalman filter.

The radar sensors will obtain a plurality of detections from the remote vehicle, and each radar scan will return different points. This in turn leads to tangential velocity uncertainty as well as angular noise, which is detrimental for a tracking algorithm that needs a certain amount of consistent radar detections in order to be able predict the movement of the remote vehicle to a sufficient degree.

The quicker the tracking algorithm can produce a sufficient prediction of the movement of the remote vehicle, the earlier the RCTA system can determine whether any action is needed.

RCTA systems are described in US 2016/291149 and US 2008/306666, where camera data is used together with radar data.

Generally, it is desirable that a tracking algorithm produces a sufficient prediction of the movement of a remote vehicle or other target object as quick as possible, regardless of if the tracking algorithm is used in an RCTA system or for any other relevant purposes such as for example general collision avoidance or automatic and/or assisted driving.

The object of the present disclosure is to provide a radar system that includes a tracking algorithm that is arranged to predict the movement of a remote vehicle or other target object to a sufficient degree in a quicker and more reliable manner than before without having to add further components.

SUMMARY AND INTRODUCTORY DESCRIPTION OF PREFERRED EMBODIMENTS

The above-described object is obtained by embodiments of a vehicle radar system including a control unit arrangement and at least one radar sensor arrangement that is arranged to transmit signals and receive reflected signals. The vehicle radar system is arranged to acquire a plurality of measured radar detections at different times. The control unit arrangement is arranged to engage a tracking algorithm using the present measured radar detections as input such that at least one track is initialized. For each track, the control unit arrangement is arranged to calculate a calculated previous radar detection that precedes the present measured radar detections, and to re-initialize the tracking algorithm using the present measured radar detections in combination with the calculated previous radar detection.

The above-described object is also obtained by embodiments of the present invention including a method for a vehicle radar system, where the method includes transmitting signals and receiving reflected signals, and acquiring a plurality of measured radar detections at different times. The method further includes engaging a tracking algorithm using the present measured radar detections as input such that at least one track is initialized. For each track, the method includes calculating a calculated previous radar detection that precedes the present measured radar detections, and re-initializing the tracking algorithm using the present measured radar detections in combination with the calculated previous radar detection.

According to some aspects of embodiments of the present invention, for each track, for each one of a plurality of measured radar detections, the control unit arrangement is arranged to calculate a corresponding predicted detection and a corresponding corrected predicted detection. The control unit arrangement is furthermore arranged to calculate a corresponding distance vector, an innovation vector, that runs between a present measured radar detection and a corresponding present predicted detection. Each innovation vector is constituted by a vector component of a first vector type and of a vector component of a second vector type. The control unit arrangement is arranged to calculate a statistical distribution of a plurality of at least one of the vector types, and to determine how the calculated statistical distribution is related to another statistical distribution, and/or to determine symmetrical characteristics of the calculated statistical distribution. The control unit arrangement is then arranged to either maintain or re-initialize the tracking algorithm in dependence of the determined result that provides data for quality measures of the track.

According to some aspects of embodiments of the present invention, the another statistical distribution is constituted by a predetermined statistical distribution where the control unit arrangement is arranged to determine to which extent the calculated statistical distribution deviates from the predetermined statistical distribution. If the deviation is determined to exceed a predefined threshold, the control unit arrangement is arranged to re-initialize the tracking algorithm.

According to some aspects of embodiments of the present invention, the another statistical distribution is constituted by a statistical distribution of components of the corresponding measured radar detections, where the control unit arrangement is arranged to determine a ratio between the calculated statistical distribution and the another statistical distribution. If the ratio is determined to deviate beyond a predefined threshold, the control unit arrangement is arranged to re-initialize the tracking algorithm.

Other examples of embodiments of the present invention are disclosed in this disclosure.

A number of advantages are obtained by use of embodiments of the present invention. Mainly, a tracking algorithm is provided that produces a sufficient prediction of the movement of a remote vehicle as quick as possible.

BRIEF DESCRIPTION OF THE DRAWINGS

The present disclosure will now be described more in detail with reference to the appended drawings, where.

DETAILED DESCRIPTION

Figure 1:
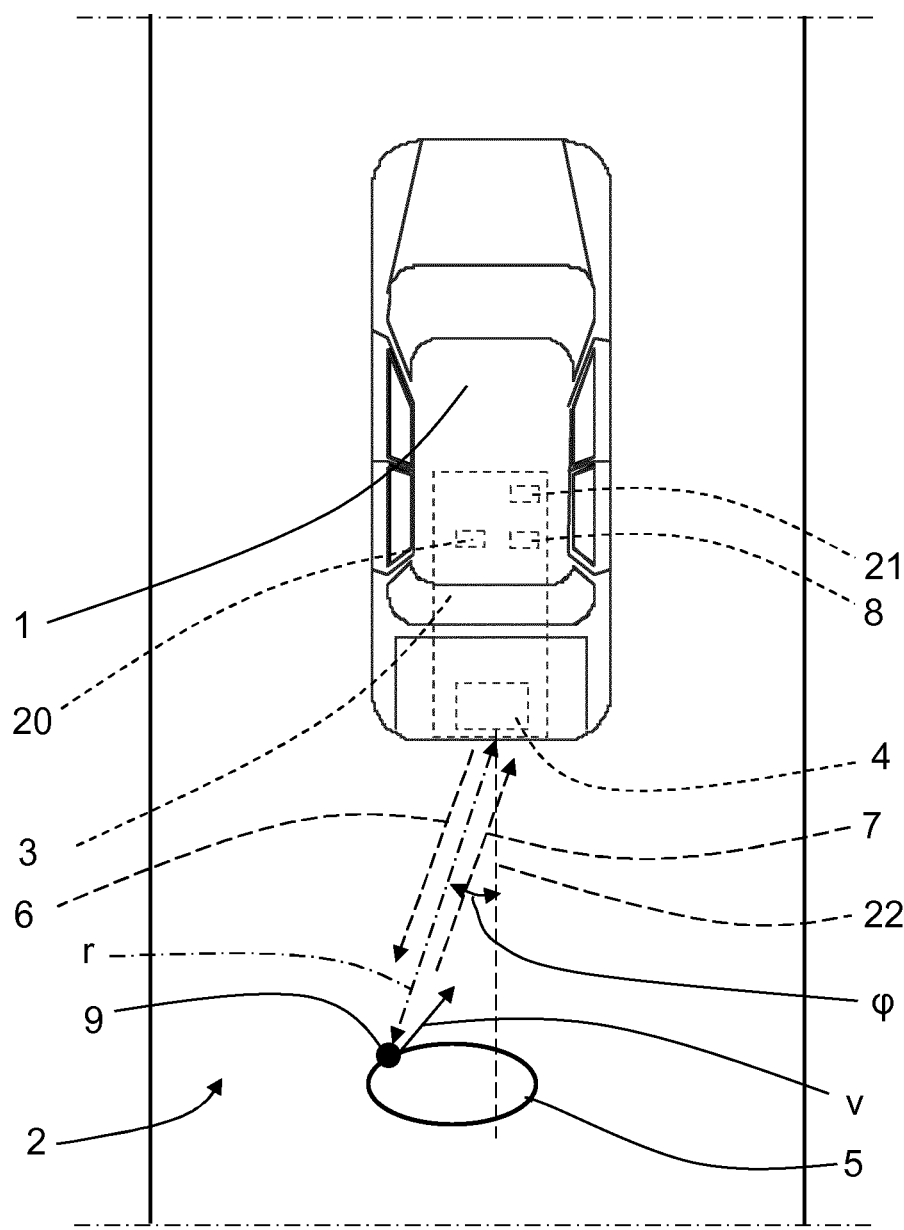
FIG. 1 shows a schematic top view of an ego vehicle.

FIG. 1 schematically shows a top view of an ego vehicle 1 arranged to run on a road 2 in a forward direction F, where the ego vehicle 1 includes a vehicle radar system 3. The vehicle radar system 3 includes a rear radar sensor arrangement 4 that is arranged to distinguish and/or resolve single targets 5 from the surroundings by transmitting signals 6 and receiving reflected signals 7 and using a Doppler effect in a previously well-known manner. The transmitted signals 6 are according to some aspects constituted by sweep signals in the form of FMCW (Frequency Modulated Continuous Wave) chirp signals 6 of a previously known kind.

The vehicle radar system 3 further includes a control unit arrangement 8 that is connected to the rear radar sensor arrangement 4 and is arranged to provide azimuth angles of possible target objects 5 by simultaneously sampling and analyzing phase and amplitude of the received signals in a previously well-known manner. In FIG. 1, one radar detection 9 is shown, having a certain detected azimuth angle (p relative a radar reference line 22; suitably a radar sensor arrangement boresight direction, distance r and radial velocity v.

Figure 2:
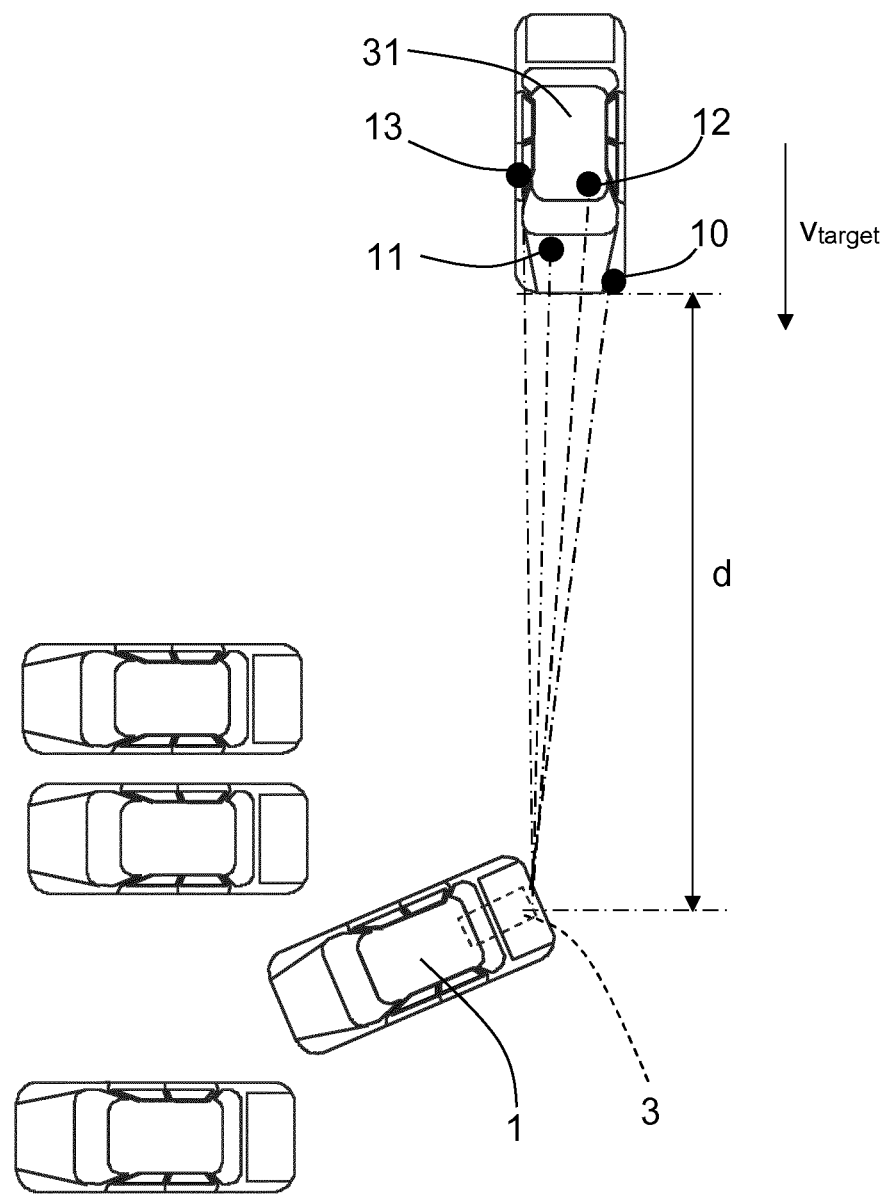
FIG. 2 shows a schematic top view of the ego vehicle and an approaching target vehicle.
Figure 3:
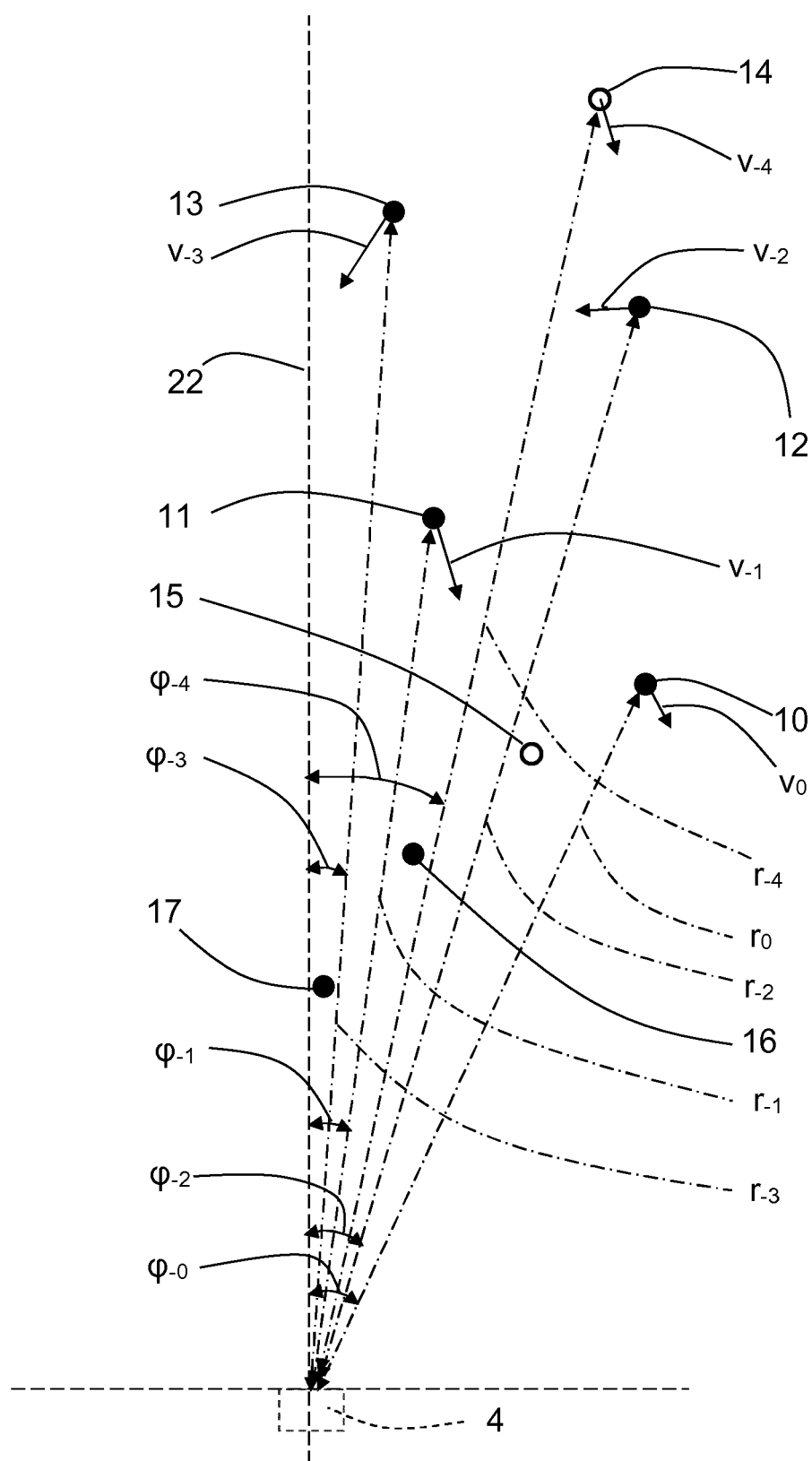
FIG. 3 shows measured detections, predicted detections and corrected detections at different times.

As shown in FIG. 2, an approaching target vehicle 31 is moving towards the ego vehicle with a velocity $v_{target}$, and is detected by use of the rear radar sensor arrangement 4. There is a plurality of measured radar detections measured by the rear radar sensor arrangement 4 at different times; at an initial time $t_0$ there is one radar detection 10 that is preceded by three previous radar detection 11, 12, 13 at three corresponding previous times $t_{-1}$, $t_{-2}$, $t_{-3}$. With reference also to FIG. 3, each measured radar detection 10, 11, 12, 13 has a certain corresponding measured azimuth angle $\varphi_0$, $\varphi_{-2}$, $\varphi_{-3}$, distance $r_0$, $r_{-1}$, $r_{-2}$, $r_{-3}$, and radial velocity $v_0$, $v_{-1}$, $v_{-2}$, $v_{-3}$. All azimuth angles $\varphi_0$, $\varphi_{-1}$, $\varphi_{-2}$, $\varphi_{-3}$ are defined relative the radar reference line 22.

The control unit arrangement 8 is arranged to engage a tracking algorithm using a Kalman filter at the initial time $t_0$ using the present four measured radar detections 10, 11, 12, 13 as input. The central component of a tracking algorithm is the filtering of the tracks. The used filter algorithm can be chosen freely. A Kalman filter is common, but there is a huge variety of filters, e.g. $\alpha$-$\beta$-filters or $\alpha$-$\beta$-$\gamma$-filters. A track is in this context defined by at least a filter state that consists of the position and its derivatives; at least velocity, but can contain also acceleration and higher derivatives. It is desired to have a reliable track engaged as early as possible, when a distance d between the vehicles 1, 31 is as large as possible.

According to the present disclosure, the control unit arrangement 8 is arranged to use the tracking algorithm to calculate a calculated previous radar detection 14 that precedes the present four measured radar detections 10, 11, 12, 13 at a corresponding previous time $t_{-4}$, where the calculated previous radar detection 14 has a certain corresponding calculated azimuth angle $\varphi_{-4}$, distance $r_{-4}$, and radial velocity $v_{-4}$.

The control unit arrangement 8 is arranged to re-start the tracking algorithm using the present four radar detections 10, 11, 12, 13 and the calculated previous radar detection 14, and then calculate a next calculated radar detection 15 at a corresponding next time $t_{+1}$. At the next time $t_{+1}$, the rear radar sensor arrangement 4 has also detected a next measured radar detection 16 that corresponds to the next calculated radar detection 15. At a yet next time $t_{+2}$, the rear radar sensor arrangement 4 has detected a following measured radar detection 17. In FIG. 3, no azimuth angle, distance, and radial velocity is indicated for the last detection 15, 16, 17 for reasons of clarity.

The calculated radar detection above are predicted radar detections before correction in the tracking algorithm. In the following, general measured radar detections, predicted radar detections and corrected radar detection for a running tracking algorithm will be discussed.

Figure 4:
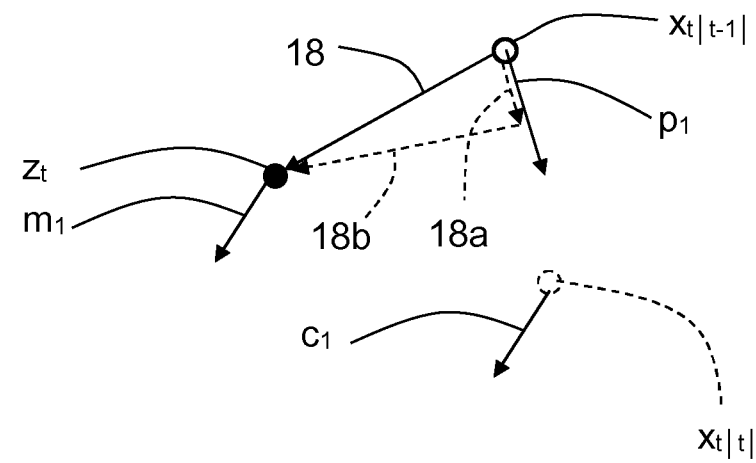
FIG. 4 shows measured detections, predicted detections and corrected detections at different times, as well as an innovation vector according to a first example.
Figure 4:
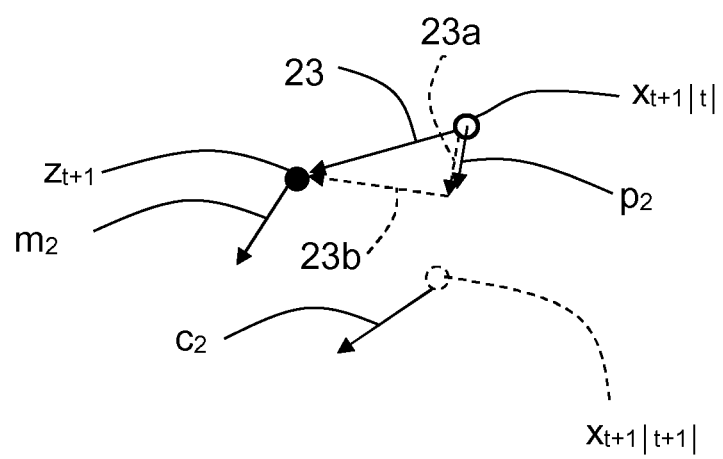

With reference to FIG. 4, a further aspect of the present disclosure will be discussed. Here, in a first example of the further aspect, a first predicted radar detection $x_t|_{t-1}|$ and a first measured radar detection $z_t$ at a time t are shown. The first predicted radar detection $x_t|_{t-1}|$ is corrected such that a first corrected radar detection $x_t|_t|$ is formed at the time t. At a next time t+1, corresponding to a following radar cycle, the procedure continues in a well-known manner such that a second measured radar detection $z_{t+1}$, a second predicted radar detection $x_{t+1}|t|$ and a second corrected radar detection $x_{t+1}|_{t+1}|$ is obtained at the time t+1. Here $x_t|_j|$ denotes a predicted radar detection at a time i when j=i−1, and a corrected radar detection at a time i when j=i.

The first measured radar detection $z_t$ has a measured velocity vector $m_1$, the first predicted radar detection $x_t|_{t−1}|$ has a predicted velocity vector $p_1$ and the first corrected radar detection $x_t|t|$ has a first corrected velocity vector $c_1$. Between the first predicted radar detection $x_t|_{t−1}|$ and the first measured radar detection $z_t$ there is a distance that corresponds to a so-called filter residium or a first innovation vector 18 that runs from the first predicted radar detection $x_t|_{t−1}|$ to the first measured radar detection $z_t$. The first innovation vector 18 is constituted by two components, a first main component 18a that runs along the predicted velocity vector $p_1$ and a first perpendicular component 18b that is perpendicular to the first main component 18a.

Correspondingly, at the next time t+1, the second measured radar detection $z_{t+1}$ has a measured velocity vector $m_2$, the second predicted radar detection $x_{t+1}|_t|$ has a predicted velocity vector $p_2$ and the second corrected radar detection $x_{t+1}|_{t+1}|$ has a second corrected velocity vector $c_2$. Between the second predicted radar detection $x_{t+1}|_t|$ and the second measured radar detection $z_{t+1}$ there is a second innovation vector 23. The second innovation vector 23 is constituted by two components, a second main component 23a that runs along the predicted velocity vector $p_2$ and a second perpendicular component 23b that is perpendicular to the second main component 23a.

Figure 5:
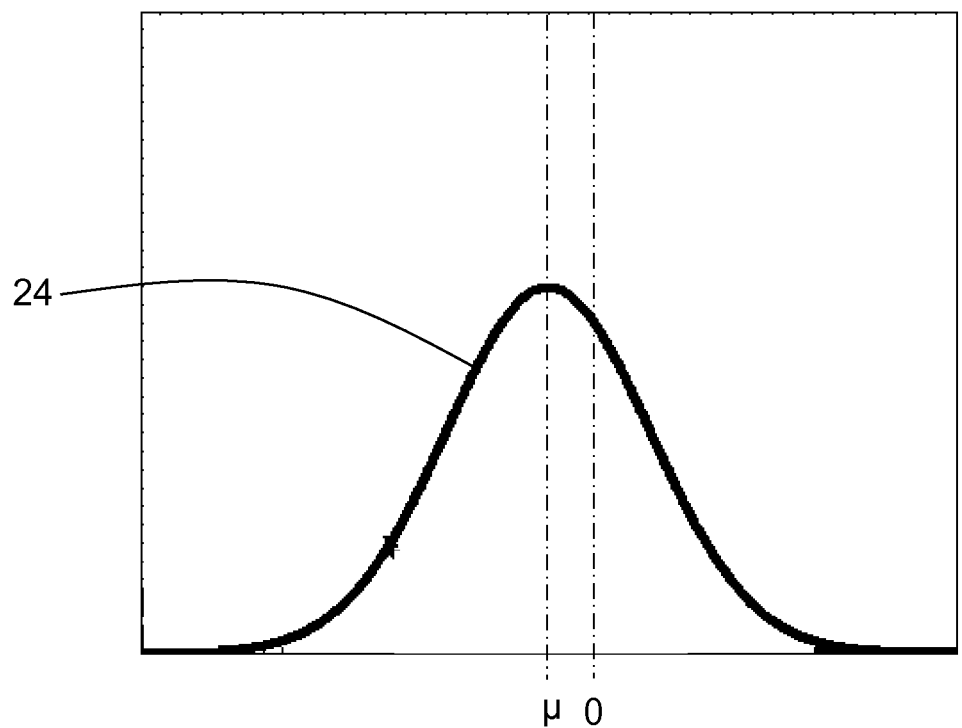
FIG. 5 shows a statistical distribution for innovation vector components.
Figure 6:
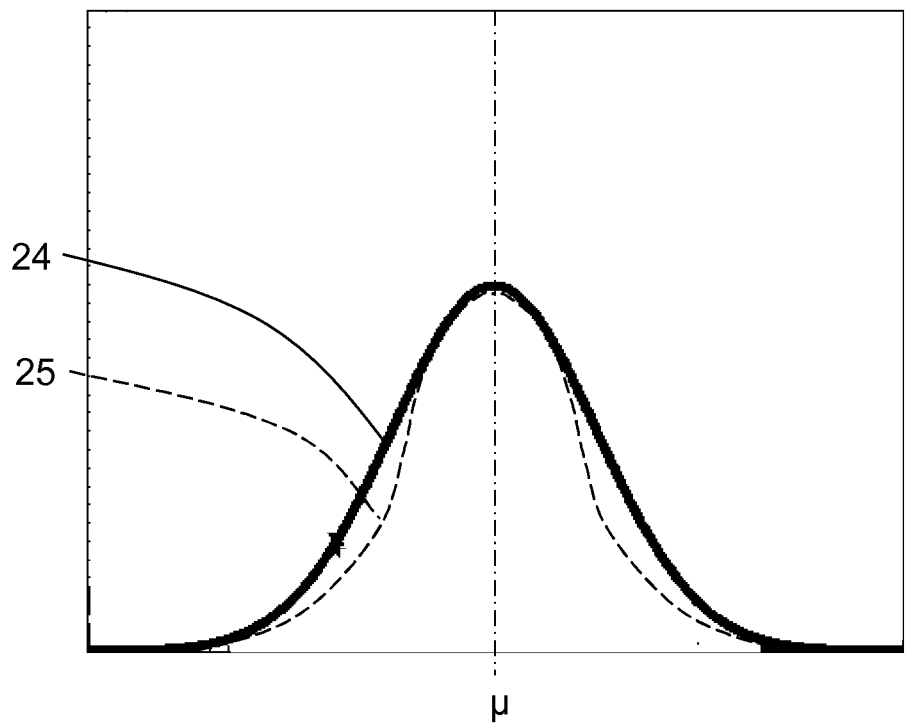
FIG. 6 shows a statistical distribution for innovation vector components parts and a predetermined statistical distribution.

In accordance with the present disclosure, with reference also to FIG. 5 and FIG. 6, the control unit arrangement 8 is arranged to determine a plurality of perpendicular components 18b, 23b for a corresponding plurality of radar cycles, and to calculate a statistical distribution 24 for the perpendicular components 18b, 23b. The control unit arrangement 8 is then arranged to determine to which extent the calculated statistical distribution deviates from a predetermined statistical distribution 25, according to some aspects a normal, or Gaussian, distribution, and/or its symmetrical characteristics such as symmetry around a zero point. If the deviation exceeds a predefined threshold, the tracking algorithm is re-started. According to some aspects, the plurality of perpendicular components 18b, 23b is constituted by about 10 to 30 perpendicular components.

The main components 18a, 23a are dependent on the predicted velocity vector $p_1$, $p_2$. According to some aspects, as an alternative or as an addition, the control unit arrangement 8 is arranged to determine a plurality of main components for a corresponding plurality of radar cycles, and to calculate a statistical distribution for said main components. The control unit arrangement 8 is then arranged to determine to which extent the calculated statistical distribution is related to the direction of the track. If the calculated statistical distribution is pointing to the rear of the track, the track is too fast, and if the calculated statistical distribution is pointing to the front of the track, the track is too slow.

In other words, it is also here determined whether the calculated statistical distribution 24 deviates from a predetermined statistical distribution 25, according to some aspects a normal, or Gaussian, distribution, and/or its symmetrical characteristics such as symmetry around a zero point. If the deviation exceeds a predefined threshold, the tracking algorithm is re-started in this case as well.

Figure 7:
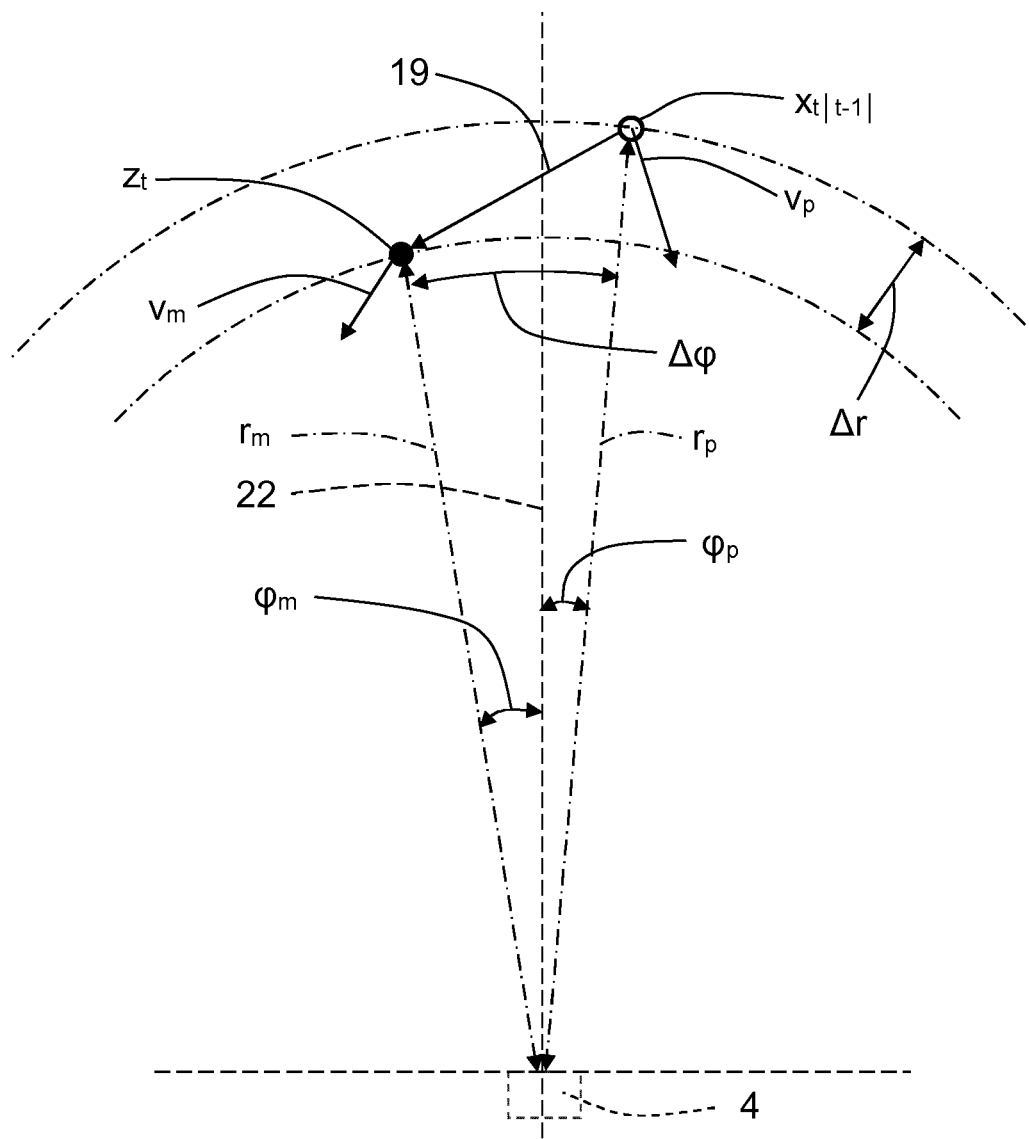
FIG. 7 shows a measured detection and a predicted detection as well as an innovation vector according to a second example.

In the following, with reference to FIG. 7, a second example of the further aspect will be provided where polar coordinates are used. The first predicted radar detection $x_t|_{t−1}|$ has a certain calculated azimuth angle $\varphi_p$, distance $r_p$, and radial velocity $v_p$, while the first measured radar detection $z_t$ has a certain measured azimuth angle $\varphi_m$, distance $r_m$, and radial velocity $v_m$. The azimuth angles $\varphi_p$, $\varphi_m$ are measured from the radar reference line 22. Between the azimuth angles $\varphi_p$, $\varphi_m$ there is a difference angle $\Delta\varphi$, and between the distances $r_p$, $r_m$ there is a difference distance $\Delta r$.

As in the previous example, between the first predicted radar detection $x_t|_{t−1}|$ and the first measured radar detection $z_t$ there is a distance that corresponds to an innovation vector 19. The innovation vector 19 is constituted by two components, an angular component, the difference angle $\Delta\varphi$, and a radial component, the difference distance $\Delta r$. For reasons of clarity only one measured radar detection $z_t$ and predicted radar detection $x_t|_{t−1}|$ are shown n FIG. 6. Of course the predicted radar detection $x_t|_{t−1}|$ has a corresponding corrected radar detection, and of course a plurality of measured radar detections, predicted radar detections and predicted radar detections is obtained during a plurality of radar cycles.

Figure 8:
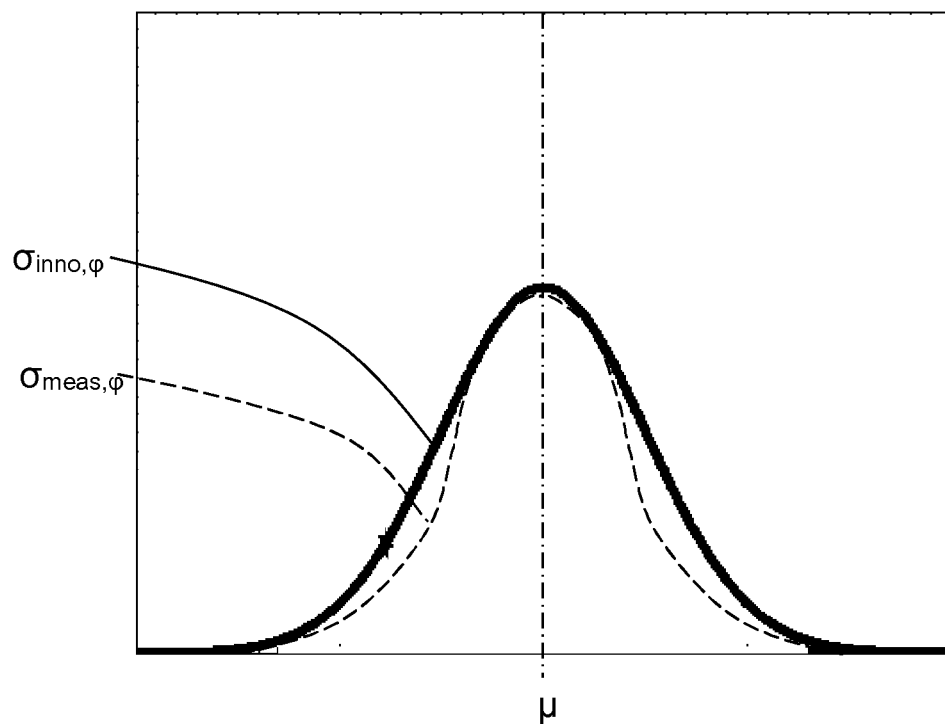
FIG. 8 shows a first statistical distribution for innovation vector components and a first statistical distribution for measured detection components.

In accordance with the present disclosure, with reference also to FIG. 8, the control unit arrangement 8 is arranged to determine a plurality of angular components $\Delta\varphi$, and a plurality of measured azimuth angles $\varphi_m$, for a corresponding plurality of radar cycles, and to calculate a first angular statistical distribution $\sigma_{inno,\varphi}$ for the angular parts components $\Delta\varphi$ and a second angular statistical distribution $\sigma_{meas,\varphi}$ for the measured azimuth angles $\varphi_m$. The control unit arrangement 8 is then arranged to determine an angular noise ratio by dividing the first angular statistical distribution $\sigma_{inno,\varphi}$ with the second angular statistical distribution $\sigma_{meas,\varphi}$.

Figure 9:
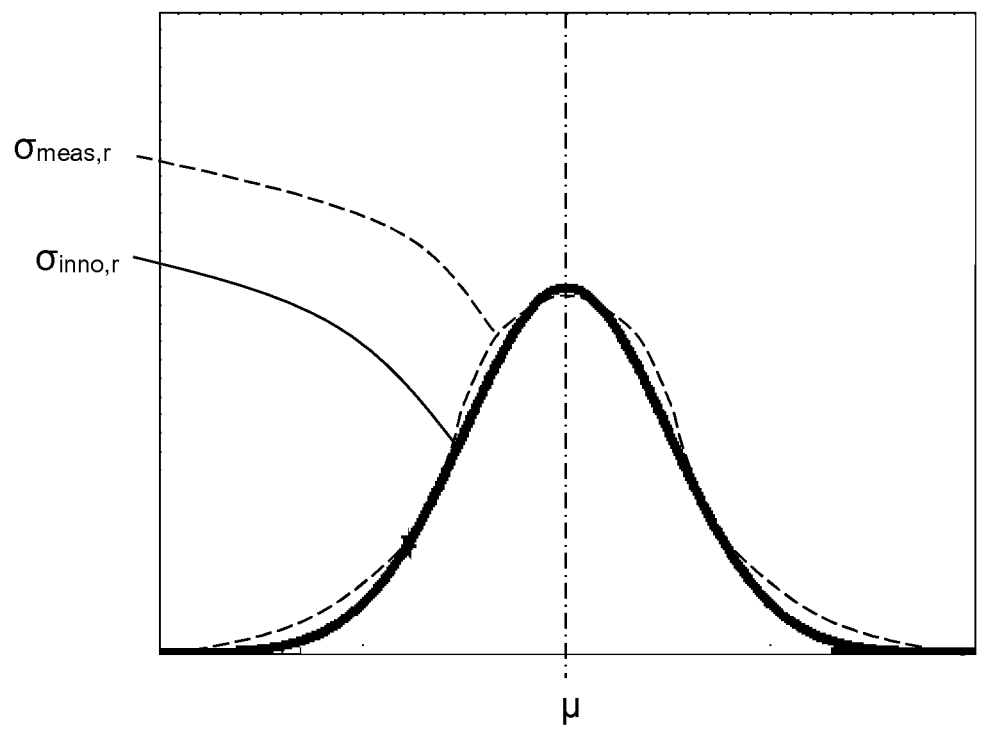
FIG. 9 shows a second statistical distribution for innovation vector components and a second statistical distribution for measured detection components.

Correspondingly, with reference also to FIG. 9, the control unit arrangement 8 is arranged to determine a plurality of radial components $\Delta r$, and a plurality of measured distances $r_m$, for a corresponding plurality of radar cycles, and to calculate a first distance statistical distribution $\sigma_{inno,r}$ for the radial components $\Delta r$ and a second distance statistical distribution $\sigma_{meas,r}$ for the measured distances $r_m$. The control unit arrangement 8 is then arranged to determine a range noise ration by dividing the first distance statistical distribution $\sigma_{inno,r}$ with the second distance statistical distribution $\sigma_{meas,r}$.

In this way it can be determined if the statistical distributions $\sigma_{inno,\varphi}$, $\sigma_{inno,r}$ of the innovation vector components $\Delta\varphi$, $\Delta r$ are wider than the measurement noise, and to which degree. If there is a deviation, that is determined to deviate beyond a predefined threshold, the tracking algorithm is re-started as in the first example.

According to some aspects, the statistical distributions $\sigma_{inno,\varphi}$, $\sigma_{inno,r}$, $\sigma_{meas,\varphi}$, $\sigma_{meas,r}$ are constituted by normal, or Gaussian, distributions.

According to some aspects, between two adjacent times, a radar cycle has passed. In this context, a radar cycle is one observation phase during which the vehicle radar system 2 is arranged to acquire data, process the data on several signal processing levels and to send out available results. This can be a fixed time interval, or it can be a dynamic time interval depending on environment conditions and processing load.

By use of the present disclosure, that can be used for any type of vehicle radar sensor arrangement, it can be determined whether a certain track fulfills certain quality measures or not, and if not, the tracking algorithm can be re-started or re-initialized. The quality measures define how well a certain track fits corresponding measurement. A core of the present disclosure lies not that the statistical distribution of innovation vector components 18a, 18b; $\Delta\varphi$, $\Delta r$ are determined and investigated. The investigation result provides data for said quality measures.

According to some aspects, a tracking procedure follows the following steps:

Step 1: Consistent measurements are searched over several measurement cycles. If a consistency is found, a track is opened. Opening a track use finding good initial values of the filter state space. This is often a crucial component, as not many measurements are available. A list of track is obtained over time.

Step 2: The state space is predicted to the next measurement cycle

Step 3: In the next radar cycle, measurements are searched that probably belong to tracks. These measurements are associated to the tracks. If no association is found, no correction is made. Each state space is corrected by its associated measurement.

Step 4: If a track is not going to be discontinued, continue with point 2, else remove the track from the list.

As indicated in FIG. 1, the ego vehicle 1 includes a safety control unit 20 and safety system 21, for example an emergency braking system and/or an alarm signal device. The safety control unit 20 is arranged to control the safety system 21 in dependence of input from the radar system 3. Such input may be input via the control unit arrangement 8.

Figure 10:
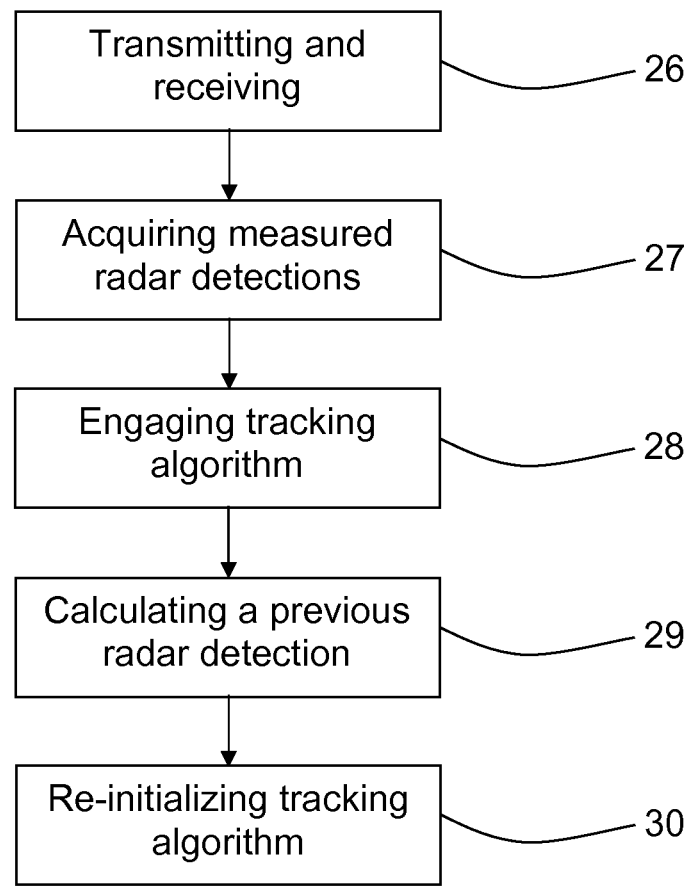
FIG. 10 shows a flowchart for a method according to the present disclosure.

With reference to FIG. 10, the present disclosure also relates to a method for a vehicle radar system 3, where the method includes the steps of:

Step 26: Transmitting signals 6 and receiving reflected signals 7.

Step 27: Acquiring a plurality of measured radar detections 10, 11, 12, 13 at different times.

Step 28: Engaging a tracking algorithm using the present measured radar detections 10, 11, 12, 13 as input such that at least one track is initialized. For each track, the method includes:

Step 29: Calculating a calculated previous radar detection 14 that precedes the present measured radar detections 10, 11, 12, 13.

Step 30: Re-initializing the tracking algorithm using the present measured radar detections 10, 11, 12, 13 in combination with the calculated previous radar detection 14.

The present disclosure is not limited to the examples above, but may vary freely within the scope of the appended claims. For example, the radar system may be implemented in any type of vehicle such as cars, trucks and buses as well as boats and aircraft.

The statistical distributions 24, 25; $\sigma_{inno,\varphi}$, $\sigma_{meas,\varphi}$; $\sigma_{inno,r}$, $\sigma_{meas,r}$, shown are only examples of statistical distributions that are used for explaining the present disclosure. The statistical distributions 24, 25; $\sigma_{inno,\varphi}$, $\sigma_{meas,\varphi}$; $\sigma_{inno,r}$, $\sigma_{meas,r}$, can have any forms possible and/or suitable within the scope of the present disclosure.

Exactly how data processing, such as calculations and determining procedures, is accomplished in practice may vary, the example disclosed above is only an example. The control unit arrangement 8 may be comprised by one or more separate or integrated control units. The safety control unit 20 is according to some aspects included in the control unit arrangement 8.

In the examples discussed there is a tracked target vehicle; generally there can be any type of tracked target object such as for example a bicycle or a pedestrian.

Other kinds of FMCW signals and FMCW signal configurations are also conceivable, as well as other types of Doppler radar signals. Other types of radar systems are also conceivable; not only FMCW radar systems are conceivable. Pulse radar, FSK (frequency-shift keying) or CW (continuous wave) waveform are also conceivable like all other kinds of suitable modulation techniques.

The schematics of vehicle radar systems are simplified, only showing components that are considered relevant for an adequate description of the present disclosure. It is understood that the general design of radar systems of this kind is well-known in the art.

A rear vehicle radar system is shown in FIG. 1 and FIG. 2, but the examples above are of course applicable for any type of vehicle radar system at any position in a vehicle.

Wordings such as perpendicular are not intended to be understood as mathematically exact, but within what is practically obtainable in the present context.

Generally, the present disclosure relates to a vehicle radar system 3 including a control unit arrangement 8 and at least one radar sensor arrangement 4 that is arranged to transmit signals 6 and receive reflected signals 7, where the vehicle radar system 3 is arranged to acquire a plurality of measured radar detections 10, 11, 12, 13 at different times; where the control unit arrangement 8 is arranged to engage a tracking algorithm using the present measured radar detections 10, 11, 12, 13 as input such that at least one track is initialized. For each track, the control unit arrangement 8 is arranged to:

calculate a calculated previous radar detection 14 that precedes the present measured radar detections 10, 11, 12, 13; and to re-initialize the tracking algorithm using the present measured radar detections 10, 11, 12, 13 in combination with the calculated previous radar detection 14.

According to some aspects, the plurality of measured radar detections 10, 11, 12, 13 constitutes at least four measured radar detections 10, 11, 12, 13.

According to some aspects, the tracking algorithm includes a Kalman filter.

According to some aspects, for each track, for each one of a plurality of measured radar detections $z_t$, $z_{t+1}$, the control unit arrangement 8 is arranged to calculate a corresponding predicted detection $x_{t|t-1}$, $x_{t+1|t}$ and a corresponding corrected predicted detection $x_{t|t}$, $x_{t+1|t+1}$, and to furthermore calculate a corresponding distance vector, an innovation vector 18, 19, that runs between a present measured radar detection $z_t$ and a corresponding present predicted detection $x_{t|t-1}$, where each innovation vector 18, 19 is constituted by a vector component of a first vector type 18a, $\Delta\varphi$ and of a vector component of a second vector type 18b, $\Delta r$, where the control unit arrangement 8 is arranged to:

calculate a statistical distribution 24; $\sigma_{inno,\varphi}$, $\sigma_{inno,r}$ of a plurality of at least one of the vector types 18a, $\Delta\varphi$; 18b, $\Delta r$;

determine how the calculated statistical distribution 24; $\sigma_{inno,\varphi}$, $\sigma_{inno,r}$ is related to another statistical distribution 25; $\sigma_{meas,\varphi}$, $\sigma_{meas,r}$; and/or determine symmetrical characteristics of the calculated statistical distribution 24; $\sigma_{inno,\varphi}$, $\sigma_{inno,r}$;

and to either maintain or re-initialize the tracking algorithm in dependence of the determined result that provides data for quality measures of the track.

According to some aspects, the another statistical distribution is constituted by a predetermined statistical distribution 25, where the control unit arrangement 8 is arranged to determine to which extent the calculated statistical distribution deviates from the predetermined statistical distribution 25, and if the deviation is determined to exceed a predefined threshold, to re-initialize the tracking algorithm.

According to some aspects, the another statistical distribution is constituted by a statistical distribution $\sigma_{meas,\varphi}$, $\sigma_{meas,r}$ of components of the corresponding measured radar detections $z_t$, $z_{t+1}$, where the control unit arrangement 8 is arranged to determine a ratio between the calculated statistical distribution $\sigma_{inno,\varphi}$, $\sigma_{inno,r}$ and the another statistical distribution $\sigma_{meas,\varphi}$, $\sigma_{meas,r}$, and if the ratio is determined to deviate beyond a predefined threshold, to re-initialize the tracking algorithm.

Generally, the present disclosure also relates to a method for a vehicle radar system 3, where the method includes the steps of:

Step 26: transmitting signals 6 and receiving reflected signals 7;

Step 27: acquiring a plurality of measured radar detections 10, 11, 12, 13 at different times;

Step 28: engaging a tracking algorithm using the present measured radar detections 10, 11, 12, 13 as input such that at least one track is initialized. For each track, the method includes:

Step 29: calculating a calculated previous radar detection 14 that precedes the present measured radar detections 10, 11, 12, 13; and Step 30: re-initializing the tracking algorithm using the present measured radar detections 10, 11, 12, 13 in combination with the calculated previous radar detection 14.

According to some aspects, the plurality of measured radar detections 10, 11, 12, 13 constitutes at least four measured radar detections 10, 11, 12, 13.

According to some aspects, the tracking algorithm uses a Kalman filter.

According to some aspects, for each track, for each one of a plurality of measured radar detections $z_t$, $z_{t+1}$, the method includes calculating a corresponding predicted detection $x_{t|t-1}$, $x_{t+1|t}$ and a corresponding corrected predicted detection $x_{t|t}$, $x_{t+1|t+1}$, and calculating a corresponding distance vector, an innovation vector 18, 19, that runs between a present measured radar detection $z_t$ and a corresponding present predicted detection $x_{t|t-1}$, where each innovation vector 18, 19 is constituted by a vector component of a first vector type 18a, $\Delta\varphi$ and of a vector component of a second vector type 18b, $\Delta r$, where the method further includes the steps of:

calculating a statistical distribution 24; $\sigma_{inno,\varphi}$, $\sigma_{inno,r}$ of a plurality of at least one of the vector types 18a, $\Delta\varphi$; 18b, $\Delta r$;

determining how the calculated statistical distribution 24; $\sigma_{inno,\varphi}$, $\sigma_{inno,r}$ is related to another statistical distribution 25; $\sigma_{meas,\varphi}$, $\sigma_{meas,r}$; and/or determining symmetrical characteristics of the calculated statistical distribution 24; $\sigma_{inno,\varphi}$, $\sigma_{inno,r}$; and either maintaining or re-initializing the tracking algorithm in dependence of the determined result that provides data for quality measures of the track.

According to some aspects, the another statistical distribution is constituted by a predetermined statistical distribution 25, where the control unit arrangement 8 is arranged to determine to which extent the calculated statistical distribution deviates from the predetermined statistical distribution 25, and if the deviation is determined to exceed a predefined threshold, to re-initialize the tracking algorithm.

According to some aspects, the another statistical distribution is constituted by a statistical distribution $\sigma_{meas,\varphi}$, $\sigma_{meas,r}$ of components of the corresponding measured radar detections $z_t$, $z_{t+1}$, where the control unit arrangement 8 is arranged to determine a ratio between the calculated statistical distribution $\sigma_{inno,\varphi}$, $\sigma_{inno,r}$ and the another statistical distribution $\sigma_{meas,\varphi}$, $\sigma_{meas,r}$, and if the ratio is determined to deviate beyond a predefined threshold, to re-initialize the tracking algorithm.

While the above description constitutes the preferred embodiment of the present invention, it will be appreciated that the invention is susceptible to modification, variation and change without departing from the proper scope and fair meaning of the accompanying claims.

The invention claimed is:

1. A vehicle radar system comprising a controller and a radar sensor that is arranged to transmit signals and receive reflected signals, where the vehicle radar system is arranged to acquire a plurality of measured radar detections of the reflected signals at different times; where the controller is arranged to engage a tracking algorithm using the measured radar detections as inputs such that at least one track is initialized, the controller is arranged to:

calculate, using the tracking algorithm, a calculated previous radar detection corresponding to the radar sensor and a corresponding previous time that precedes said different times; and to re-initialize the tracking algorithm using the present measured radar detections in combination with the calculated previous radar detection; and for the at least one track, for each one of the plurality of measured radar detections, the controller is arranged to calculate a corresponding predicted detection and a corresponding corrected predicted detection, and to furthermore calculate a corresponding distance vector and, an innovation vector-that runs between the present measured radar detection and the corresponding predicted detection, where the innovation vector is constituted by a vector component of a first vector type and of a vector component of a second vector type, where the controller is further arranged to:

calculate a statistical distribution of a plurality of at least one of the first and second vector types;

determine how the calculated statistical distribution is related to another statistical distribution; and/or determine symmetrical characteristics of the calculated statistical distribution;

and to either maintain or re-initialize the tracking algorithm in dependence of the symmetrical characteristics of the calculated statistical distribution that provides data for a quality measure of the track.

2. A vehicle radar system according to claim 1 further comprising, the plurality of measured radar detections constitutes at least four measured radar detections.

3. A vehicle radar system according to claim 1 further comprising, the tracking algorithm includes a Kalman filter.

4. A vehicle radar system according to claim 1 further comprising, the another statistical distribution is constituted by a predetermined statistical distribution, where the controller is arranged to determine to which extent the calculated statistical distribution deviates from the predetermined statistical distribution, and if the deviation is determined to exceed a predefined threshold, to re-initialize the tracking algorithm.

5. A vehicle radar system according to claim 1 further comprising, the another statistical distribution is constituted by a statistical distribution of components of the corresponding measured radar detections, where the controller is arranged to determine a ratio between the calculated statistical distribution and the another statistical distribution, and if the ratio is determined to deviate beyond a predefined threshold, to re-initialize the tracking algorithm.

6. A method for a vehicle radar system comprising the steps of:
   transmitting, by a radar sensor, signals and receiving, by the radar sensor, reflected signals;
   acquiring, by the radar sensor, a plurality of measured radar detections at different times;
   engaging a tracking algorithm using the measured radar detections as inputs such that at least one track is initialized, for each track,
   calculating, using the tracking algorithm, a calculated previous radar detection corresponding to the radar sensor and a corresponding previous time that precedes said different times;
   re-initializing the tracking algorithm using the present measured radar detections in combination with the calculated previous radar detection; and
   for each one of the plurality of the measured radar detections, the method includes calculating a corresponding predicted detection and a corresponding corrected predicted detection, and calculating a corresponding distance vector and an innovation vector that runs between the present measured radar detection and a corresponding present predicted detection, where the innovation vector is constituted by a vector component of a first vector type and of a vector component of a second vector type, where the method further comprises:
   calculating a statistical distribution of a plurality of at least one of the first and second vector types;
   determining how the calculated statistical distribution is related to another statistical distribution; and/or
   determining symmetrical characteristics of the calculated statistical distribution; and either maintaining or re-initializing the tracking algorithm in dependence of the symmetrical characteristics of the calculated statistical distribution that provides data for quality measures of the track.

7. The method according to claim 6 further comprising, the plurality of measured radar detections constitutes at least four of the measured radar detections.

8. The method according to claim 6 further comprising, the tracking algorithm uses a Kalman filter.

9. The method according to claim 6, wherein the another statistical distribution is constituted by a predetermined statistical distribution, and wherein the method further comprises determining an extent to which the calculated statistical distribution deviates from the predetermined statistical distribution, and if the deviation is determined to exceed a predefined threshold, to re-initialize the tracking algorithm.

10. The method according to claim 6, wherein the another statistical distribution is constituted by a statistical distribution of components of the corresponding measured radar detections, and wherein the method further comprises determining a ratio between the calculated statistical distribution and the another statistical distribution, and if the ratio is determined to deviate beyond a predefined threshold, to re-initialize the tracking algorithm.

* * * * *